United States Patent [19]

Stahlecker

[11] E Patent Number: Re. 33,190

[45] Reissued Date of Patent: Apr. 3, 1990

[54] ATTACHMENT DEVICE FOR AN OPENING ROLLER AND A METHOD FOR USING THE ATTACHMENT DEVICE

[75] Inventor: Fritz Stahlecker, Bad Überkingen

[73] Assignee: Hans Stahlecker, Fed. Rep. of Germany

[21] Appl. No.: 349,842

[22] Filed: May 8, 1989

Related U.S. Patent Documents

Reissue of:

[64] Patent No.: 4,715,177
Issued: Dec. 29, 1987
Appl. No.: 38,136
Filed: Apr. 14, 1987

U.S. Applications:

[63] Continuation of Ser. No. 224,139, Jul. 26, 1988.

[30] Foreign Application Priority Data

Apr. 25, 1986 [DE] Fed. Rep. of Germany ..... 3614033

[51] Int. Cl.[4] ..... D01H 7/895; D01H 7/892; D01G 15/28

[52] U.S. Cl. ..... 57/408; 19/97

[58] Field of Search ..... 57/400, 408, 412; 19/97, 98, 105, 112, 219, 266

[56] References Cited

U.S. PATENT DOCUMENTS

| | | | |
|---|---|---|---|
| 4,044,427 | 8/1977 | Ankom et al. | 19/97 |
| 4,163,304 | 8/1979 | Laflaguiere et al. | 19/97 |
| 4,196,496 | 4/1980 | Stauffer et al. | 19/97 |
| 4,296,527 | 10/1981 | Eadie | 57/408 X |
| 4,300,265 | 11/1981 | Heinen | 57/408 X |
| 4,352,224 | 10/1982 | Grimshaw et al. | 19/97 |
| 4,435,953 | 3/1984 | Schmid et al. | 57/408 |

FOREIGN PATENT DOCUMENTS

| | | |
|---|---|---|
| 2911361 | 10/1980 | Fed. Rep. of Germany . |
| 3515153 | 11/1985 | Fed. Rep. of Germany . |

*Primary Examiner*—Donald Watkins
*Attorney, Agent, or Firm*—Barnes & Thornburg

[57] ABSTRACT

An opening roller apparatus is provided for an open-end spinning arrangement of the type having a shaft supporting an opening roller base body. The opening roller apparatus includes an exchangeable fitting ring device which fits over the opening roller base body. An attaching device is provided for holding the exchangeable fitting ring on the opening roller base body. The attaching device operates free of the opening roller base body. A process for carrying out the exchanging or replacing of the fitting ring device is also provided.

25 Claims, 1 Drawing Sheet

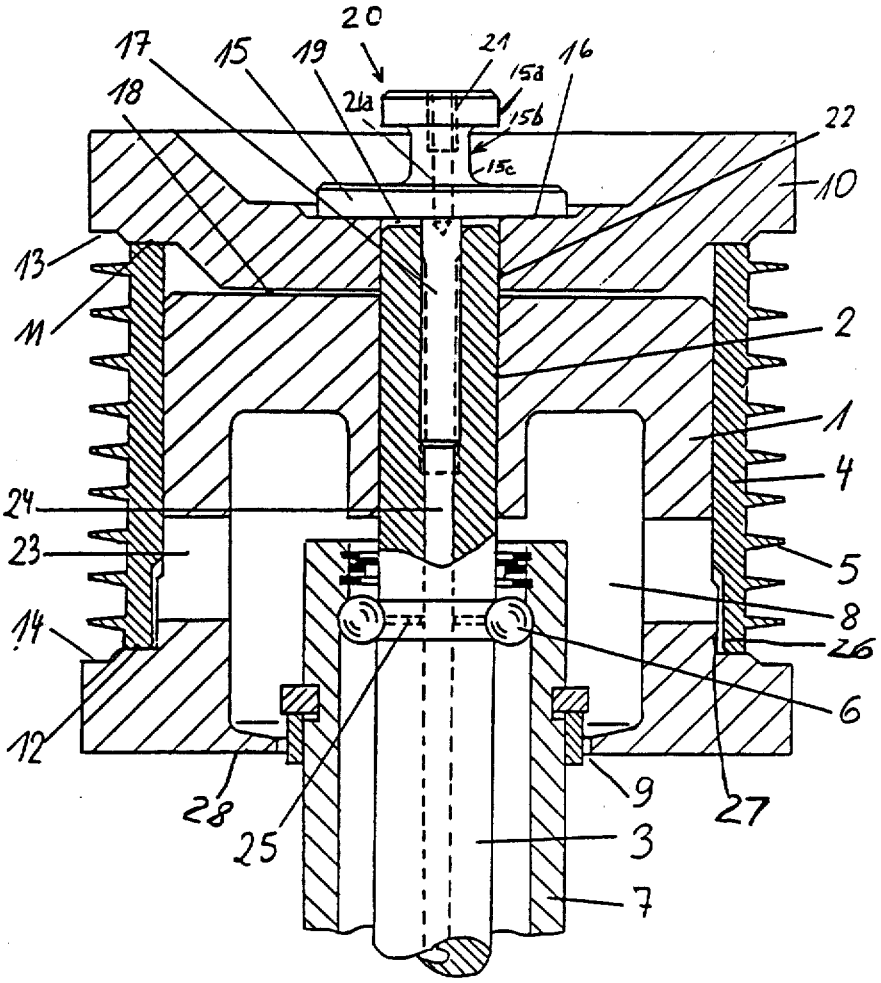
20
17
15
19
21
16
15a
18
24a
15b
22
15c
10
13
11
2
1
4
24
23
5
8
14
26
6
12
9
28
27
25
3
7

ATTACHMENT DEVICE FOR AN OPENING ROLLER AND A METHOD FOR USING THE ATTACHMENT DEVICE

Matter enclosed in heavy brackets [ ] appears in the original patent but forms no part of this reissue specification; matter printed in italics indicates the additions made by reissue.

*This is a continuation of application Ser. No. 07/224,139, filed July 26, 1988 (Reissue Application of U.S. Pat. No. 4,715,177, issued Dec. 29, 1987).*

BACKGROUND AND SUMMARY OF THE INVENTION

The invention relates to an opening roller attachment for an open-end spinning arrangement of the type having a base body arranged on a shaft. A method for attaching a fitting ring device to a base body is also provided.

In the case of known opening rollers of the initially mentioned type, a tension disk is fastened at the base body of the opening roller. In that case, it is known (DE-OS No. 35 15 153) to develop the tension disk only as a ring that is pressed or screwed onto the base body. In the case of another embodiment of this construction, it is provided that the tension disk is fastened at the base body by several screws.

In the case of another type of construction (DE-OS No. 29 11 361), it is provided that the tension disk is screwed onto a thread lug of the base body, and in addition, also has a circumferential surface which supports the fitting ring. Opening rollers of this type for open-end spinning arrangements run at relatively high speeds, for example, 6,000 to 12,000 $min^{-1}$, so that it is necessary to balance these opening rollers as precisely as possible. The use of tension rollers of this type has resulted in recurring problems when the fitting ring is exchanged and the tension disks are remounted. After this procedure, the balancing is no longer assured with sufficient precision. In addition, as a rule, several tolerance surfaces (surfaces which require close manufacturing tolerances) are provided in these known constructions that result in an increase in manufacturing costs.

One object of the invention is to provide an opening roller of the initially-mentioned type in which as few tolerance surfaces as possible are required.

Another object of the invention is to provide an opening roller assembly that is easy to manufacture and which guarantees a sufficiently precise balancing after an exchange of a fitting ring.

This object is achieved by providing an attachment for attaching an exchangeable fitting ring device on an opening roller base body arranged on a shaft such that the attachment device operates free of the base body. Using this attachment, the fitting ring can be exchanged in case of wear of the fitting or also when changing over to processing of a different fiber material.

By using this preferred embodiment, it is achieved that only one tolerance surface is required for the tension disk, namely the tolerance surface in the direction to the shaft. In other advantages features of certain preferred embodiments of the invention, the attachment device includes a fastening part which fastens the attachment part directly to the shaft of the spinning arrangement. In these embodiments, the attaching device that is centered at the shaft is better balanced which results in an improved concentricity. In addition, a balancing in the area of the attaching device can also be restored after a demounting and subsequent mounting using this arrangement.

According to other advantages features of certain preferred embodiments of the invention, it is provided that the opening roller apparatus further includes an opening roller base body arranged on the shaft. The attaching means includes an attachment flange and the opening roller base body includes a body flange facing the attachment flange. The attaching device clamps the fitting ring between the attaching flange and the body flange. In certain preferred embodiments of the invention, the attaching device includes a centering part which centers the attaching device at the shaft of the spinning arrangement.

According to other advantageous features of certain preferred embodiments of the invention, it is provided that the interior surface of the fitting ring, connecting to the facing surface of a flange of the base body, is provided with an indentation to which an elevation of the circumferential surface of the base body is assigned. This assures that the fitting ring can be mounted on the base body only in a certain position, so that operating errors particularly during the exchange of the fitting rings are reliably avoided. Thus, it is possible that untrained personnel, who do not have any special knowledge concerning the function of the opening roller and/or concerning the correct installing position of the fitting ring, can carry out this exchange. In practice, it was found that in the known procedures, particular mounting errors would often occur that resulted in disturbances when the opening roller was installed back into the spinning arrangement.

According to other advantageous features of certain preferred embodiments of the invention, it is provided that the attaching device includes a tension disk which includes a bore fitted onto the shaft protruding beyond the base body, and the tension disk is held in axial direction by a bolt or screw that is centrally screwed into the shaft and extends over the outer circumference of the shaft in radial direction. This embodiment has proven to be particularly advantageous since the mounting of the threaded bore required in the shaft for the bolt can be carried out on the same machine and during the same work process, with which the outer diameter of the shaft is manufactured.

According to other advantageous features of certain preferred embodiments of the invention, it is provided that the fitting ring is held radially only by the base body. The tension disk only provides the axial clamping-in of the fitting ring so that for the receiving of the fitting ring, no additional tolerance surface must be provided that is round with respect to the axis of rotation.

According to other advantageous features of certain preferred embodiments of the invention, it is provided that the head of the bolt is equipped with a flange that is assigned to a tension surface of the tension disk. A shank connects to the flange, and is equipped with a ring groove and a gripping edge. Therefore, the bolt can be used to grip the opening roller, which can be pulled out of the spinning arrangement for demounting the whole opening roller.

According to other advantageous features of certain preferred embodiments of the invention, it is provided that the flange of the tension disk is flexible with respect to the tension surface at which the bolt engages. Therefore, a spring effect occurs in axial direction. In this embodiment, the tension disk is developed as a type of spring element which provides a secure clamping-in of the fitting ring, without having to establish excessive requirements with respect to the tolerance-free design of the flange of the tension disk and/or the end faces of the fitting.

According to other advantageous features of certain preferred embodiments of the invention, it is provided that the axial threaded bore of the shaft includes a lubricant bore extending into the area of at least one bearing holding the shaft and at least one lubricant duct branches off from this bore leading to the bearing. Thus, in an advantageous way, the bore that is required for the mounting of the tension disk is assigned an additional function.

Other objects, advantages and novel features of the present invention will become apparent from the following detailed description of the invention when considered in conjunction with the accompanying drawing.

BRIEF DESCRIPTION OF THE DRAWING

The drawing FIGURE is an axial, sectional view of an opening roller and of a part of a bearing according to a preferred embodiment of the invention.

DETAILED DESCRIPTION OF THE DRAWING

The shown opening roller is mounted on a shaft (3) that is disposed in a bearing housing (7) by two bearings, of which only one bearing (6) is shown. The end of the shaft (3) that is not shown projects beyond the bearing housing (7) and is equipped with a driving wharve. The actual opening roller is arranged on the end of the shaft (3) that faces away from the driving wharve.

A base body (1) is slid onto the shaft (3) by a press fit (2). If necesssary, the axial position of the base body (1) is secured in the direction of the bearing housing (7) by a collar, a securing ring or the like. The base body (1) has a cylindrical outer surface onto which a fitting ring (4) is slid with an easily releasable sliding fit. The fitting ring (4) is equipped with a fitting (5) of teeth or needles. In a preferred embodiment, the fitting (5) is ground out of a full ring and is thus made in one piece with the fitting ring (4).

After sliding onto the base body (1), an end face of the fitting ring (4) rests against a flange (12) of the base body (1). The opposite end face of the fitting ring (4), that projects over the base body (1) in axial direction, is braced with respect to the flange (12) by a flange (11) of a tension disk (10).

The tension disk (10) has a centric bore (22) by means of which it is slid onto the shaft (3) projecting toward the outside over the base body (1), with a slight sliding fit. The axial securing of the tension disk (10) takes place via a bolt (17) that is screwed into a centric threaded bore of the shaft (3). The bolt (17) is equipped with a head (20) that has a flange (15) that supports itself against a radial tension surface (16) of the tension disk (10). A gripping edge (15a) is connected to the outside of the flange (15) via a shank (15b) which includes an annular groove (15c). In the center, the head (20) of the bolt (17) is provided with a recess (21), such as a polygonal cross-sectional slot, that serves as a working surface for a tool by which the bolt (17) can be turned. To prepare for the recess (21), a blind bore (21a) can be provided. The recess (21) extends over only a partial length of the bore (21a). In certain preferred embodiments, the shape of the polygonal cross-section is a hexagon.

As shown in the drawing, the length of the fitting ring (4) that projects axially over the base body (1) and the thickness of the tension disk (10) are coordinated with one another in such a way that in the mounted condition, a respective gap (18) remains between the tension disk (10) and the base body (1) as well as a gap (19) between the flange (15) and the end of the shaft (3).

As also shown in the drawing, the tension disk (10) has an approximately shell-shaped design by means of which it is achieved that the area of the flange (11) in axial direction is slightly flexible with respect to the central area of the tension disk (10), i.e., in the area of the tension surface (16), so that the tension disk (10) is elastically flexible in the manner of a disk spring. Using this shell-shaped embodiment, the head (20) of the bolt (17) is arranged inside the tension disk (10) in an at least partly hidden way.

The fitting ring (4) in a preferred embodiment, does not require collars or the like, especially because the fitting (5) of the fitting ring (4) is worked out of a solid material in one piece with the fitting ring (4). In order to protect the fitting (5) from damage, the flange (12) of the base body (1) as well as the flange (11) of the tension disk (10) are extended in radial direction by projections (13, 14), at least into the area of the points of the fitting (5). As shown in the drawing, each of these projections (13, 14) is recessed with respect to the flange surfaces of the flanges (11, 12) clamping in the end faces of the fitting ring (4).

In order to assure that the fitting ring (4) can only be installed in the correct position, the interior surface of the fitting ring (4) is equipped with a ring-groove-type recess (26) in the area of the end faces facing toward the flange (12) of the base body (1). A collar-type elevation (27) of the base body (1) is assigned to this indentation (26). In axial direction, this elevation (27), is a little shorter than the indentation (26). The radial width of the elevation (27) being less than the radial depth of the indentation (26) so that the fitting ring (4) and the base (1) body do not come in contact with one another in the area of the indentation (26).

The base body (1) has a pot-shaped design and reaches over the end of the bearing housing (7) facing the base body (1), leaving a hollow space (8). The base body (1) is equipped with a collar (28) that forms a sealing gap (9) at the bearing housing (7) or a sealing insert mounted on the bearing housing. In order to be able to clean the hollow space (8), the base body is equipped with one or several radial bores (23) that are covered by the fitting ring (4) during the operation. For cleaning the hollow space from contaminations or fiber residues or the like that are deposited there, after the tension ring (10) is removed, the fitting ring (4) can be slid axially far enough such that the bores (23) become accessible for a cleaning tool, particularly a compressed-air nozzle.

In the case of the shown embodiment, it is also provided that the threaded bore receiving the bolt (17) holding the tension disk (10) is extended in axial direction of the shaft (3) and extends to the two bearings (6). In the area of these bearings (6), lubricant ducts (25) branch off from this axial bore (24) so that, after the unscrewing of the bolt (17), lubricant can be supplied to the bearings (6).

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the appended claims.

What is claimed is:

1. Opening roller apparatus for an open-end spinning arrangement of the type having a shaft supporting the opening roller and an opening roller base body arranged on the shaft comprising:

an exchangeable fitting ring means, said exchangeable fitting ring means fitting over said opening roller base body;

attaching means for attaching said exchangeable fitting ring means on said opening roller base body, said attaching means operating free of said opening roller base body.

2. Apparatus as in claim 1, wherein the attaching means includes fastening means for fastening the attaching means directly to the shaft of the spinning arrangement.

3. Apparatus as in claim 2, wherein the attaching means includes an attachment flange and the opening roller base body includes a body flange facing said attachment flange, said attaching means clamping the fitting ring means between the attachment flange and the body flange.

4. Apparatus as in claim 3, wherein the attaching means includes centering means for centering the attaching means at the shaft of the spinning arrangement.

5. Apparatus as in claim 4, wherein the fitting ring means includes an indentation from a ring surface facing the opening roller base body at an end of the fitting ring means adjacent the body flange, and wherein the opening roller base body includes an elevation on an outer ring surface of the opening roller base body facing the fitting ring means, said elevation assigned to said fitting ring indentation.

6. Apparatus as in claim 5, wherein said indentation of the fitting ring means includes a ring groove around the fitting ring means, said ring groove having a depth; and wherein said elevation of the base body includes a collar-type arrangement, said elevation having a height, said indentation depth being greater than the height of said elevation.

7. Apparatus as in claim 6, wherein the fitting ring means is held radially only by said opening roller base body.

8. Apparatus as in claim 4, wherein said attaching means includes a tension disk having a bore therethrough, said bore of said tension disk being fitted onto the shaft of the spinning arrangement, said attaching means further including securing means for axially securing said tension disk to said shaft.

9. Apparatus as in claim 8, wherein said securing means includes a bolt, said bolt being removably bolted into a center section of the shaft that extends past the opening roller base body, said bolt extending over the shaft in a radial direction.

10. Apparatus as in claim 8, wherein the fitting ring means extends past an end of the opening roller base body opposite the body flange in an axial direction.

11. Apparatus as in claim 9, wherein the tension disk includes a shell-shaped indentation on a side facing away from said opening roller base body, said shell-shaped indentation housing the bolt securing the tension disk.

12. Apparatus as in claim 11, wherein said tension disk includes a tension surface at a bottom area of said shell-shaped indentation.

13. Apparatus as in claim 12, wherein said bolt includes a head, said head including a flange assigned to said tension surface of the tension disk.

14. Apparatus as in claim 13, wherein said head further includes a shank connected to the flange, said shank including a gripping edge and an annular groove disposed between the flange and the gripping edge.

15. Apparatus as in claim 13, wherein said shank includes an axial recess means serving as a tool working surface.

16. Apparatus as in claim 8, wherein said fitting ring means includes fitting points facing away from said opening roller base body.

17. Apparatus as in claim 16, wherein said flanges of the opening roller base body and the tension disk include extensions, said extensions extending in radial direction at least to the area of the fitting points of the fitting ring means, said extensions being spaced from end faces of the fitting ring means.

18. Apparatus as in claim 8, wherein said flange of the tension disk is flexibly springy in axial direction with respect to the tension surface at which the bolt engages.

19. Apparatus as in claim 8, wherein said opening roller base body includes a circumferential surface, said circumferential surface being flexibly springy in radial direction.

20. Apparatus as in claim 1, further including a shaft supporting the opening roller base body, said shaft including a shaft bore.

21. Apparatus as in claim 20, wherein said shaft bore includes an axial lubricant feed threaded bore, said axial threaded bore extending into an area of at least one bearing assigned to the shaft, said lubricant feeding threaded bore including at least one lubricant duct branching off and leading to the bearing.

22. Method of installing an opening roller ring assembly on an opening roller unit for open-end spinning installations of the type having a shaft supported by bearings, and an opening roller base body arranged on the shaft, said method comprising:

selecting a fitting ring means having an internal bore;

placing said fitting ring means with its internal bore over the opening roller base body; and attaching said fitting ring means on said opening roller base body with an attaching means, said attaching means operating free of said opening roller base body.

23. Method as in claim 22, wherein said attaching includes fastening the fitting ring means directly to the shaft of the spinning arrangement.

24. Method as in claim 23, wherein said fastening includes centering the attaching means at the shaft of the spinning arrangement.

25. Method as in claim 24, wherein said fastening includes bolting the attaching means into the shaft of the spinning arrangement.

* * * * *